(12) United States Patent
Speckhart et al.

(10) Patent No.: US 6,789,790 B2
(45) Date of Patent: Sep. 14, 2004

(54) HELICAL COIL SPRING DAMPER ASSEMBLY

(76) Inventors: Frank H. Speckhart, 3411 Kingston Pike, Knoxville, TN (US) 37919; Brian David Mongold, 23232 Tuck Rd., Farmington Hills, MI (US) 48336; Hyunjun Chun, 8899 Stonebridge Ct., Belleville, MI (US) 48111; Von M Tyler, Jr., 2000 Wilison Rd. #107, Knoxville, TN (US) 37912

(*) Notice: Subject to any disclaimer, the term of this patent is extended or adjusted under 35 U.S.C. 154(b) by 0 days.

(21) Appl. No.: 10/174,255

(22) Filed: Jun. 18, 2002

(65) Prior Publication Data

US 2003/0230836 A1 Dec. 18, 2003

(51) Int. Cl.[7] ............................................. B60G 13/00
(52) U.S. Cl. ...................... 267/204; 267/169; 267/287; 123/90.66; 123/188.13
(58) Field of Search .................................. 267/135, 134, 267/169, 74, 166, 167, 204, 287; 123/188.13, 90.66; 251/337

(56) References Cited

U.S. PATENT DOCUMENTS

| | | | | |
|---|---|---|---|---|
| 1,928,678 A | * | 10/1933 | Sjolander | 267/135 |
| 3,128,985 A | * | 4/1964 | Wallerstein | 267/140.11 |
| 3,157,392 A | * | 11/1964 | Kitamura | 267/157 |
| 3,814,357 A | * | 6/1974 | Rontgen | 248/573 |
| 3,847,380 A | * | 11/1974 | Kearns | 267/179 |
| 4,479,461 A | * | 10/1984 | Felice et al. | 123/90.65 |
| 4,538,563 A | * | 9/1985 | Mayers | 123/90.67 |
| 4,779,854 A | * | 10/1988 | Idigkeit et al. | 267/204 |
| 4,856,765 A | * | 8/1989 | Kohno et al. | 267/166 |
| 4,869,473 A | * | 9/1989 | Giovanni | 267/74 |
| 4,891,955 A | * | 1/1990 | Klausing et al. | 62/295 |
| 5,090,657 A | * | 2/1992 | Dreiman | 248/624 |
| 5,690,322 A | * | 11/1997 | Hay | 267/148 |
| 5,695,421 A | * | 12/1997 | Fukuda | 474/82 |
| 6,098,970 A | * | 8/2000 | Lowe | 267/179 |
| 6,485,004 B1 | * | 11/2002 | Licata et al. | 267/74 |

* cited by examiner

Primary Examiner—Benjamin A Pezzlo
(74) Attorney, Agent, or Firm—Michael E. McKee

(57) ABSTRACT

A device for reducing the resonant vibrations of a helical valve spring of an internal combustion engine includes a member, such as a tension cable, attached between one end of the spring and a coil mid-section of the spring for limiting the movement of the coil mid-section away from the one end of the spring to about the distance between the coil mid-section and the one end of the spring when the spring is in a condition corresponding with a condition at which the spring is in static equilibrium.

11 Claims, 5 Drawing Sheets

HELICAL COIL SPRING DAMPER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates generally to coil or helical spring dampers used in valve assemblies of internal combustion engines and relates more particularly to such spring dampers which operate to inhibit oscillations of valve coil springs such that may occur in valve assemblies of internal combustion engines.

Internal combustion engines commonly used helical coil springs to bias combustion chamber valves to the closed position. At high engine speeds valve springs can resonate which can cause erratic valve operation. This can cause damage to the engine and in general impair engine performance. For example, impaired engine performance can occur when the vibration of a spring coil after the valve is closed causes the valve to slightly reopen. This is sometimes called valve bounce even though it may be caused by excessive spring vibration. Even a slight reopening of the valve after the valve is closed can result in a significant loss of power and efficiency.

This magnitude of the vibration of the valve spring coils is increased when the condition of resonance is reached which usually occurs at high engine speeds. Various techniques have been used to reduce valve spring vibration. One such technique is to increase the preload force and/or spring rate of the helical spring. This tends to reduce valve bounce and provide more stable operation. The disadvantage of this technique is that valve actuation forces are increased which results in increase frictional losses and increased fuel consumption. The increased spring forces will cause corresponding increases in spring stresses that can shorten spring life.

Another common technique used to damp spring vibration is the use of a device that uses friction to dissipate kinetic energy from vibrating spring coils. Such application or frictional dampers are shown in U.S. Pat. Nos. 4,538,563, 4,5009,473, 4,479,461, 3,336,913 and others. These types of dampers have the disadvantage of causing high temperatures due to the friction heating. Analysis has shown that the effectiveness of friction dampers is limited because of the magnitude of the frictional forces that will not cause excessive heating is too small to achieve significant damping.

It is the object of the present invention to provide a means for reducing the vibration of valve springs used in internal combustion engines with none of the disadvantages that exists when friction type dampers are used. The present invention also does not require increased spring forces to limited valve spring vibration and valve bounce. The present invention provides control to valve springs that will essentially prevent valve bounce from occurring.

Another object to the present invention to provide an assembly that is well suited for use in an internal combustion engines where little space may be available.

SUMMARY OF THE INVENTION

Computation simulations have shown that valve bounce due to spring vibrations can essentially be eliminated if the approximate-middle valve spring coil is restrained from extending a small distance past its static-equilibrium position. The static-equilibrium position of the middle coil is defined to be the position of the coil when the valve is close.

This invention resides in the area of the valve spring. Valve springs are usually helical and can involve concentric springs. With regard t this invention, a valve spring referrers to the spring assembly (including concentric springs) that act on an individual valve. The base of the valve spring, which does not move, rests on engine head. The opposite end of the valve spring is attached to the top of the engine valve commonly using a valve spring retainer. While the engine is running, this retainer end of the valve spring moves with a reciprocating motion that is driven by the camshaft. This invention involves the means for restraining the approximate-middle valve spring coil from extending past its approximate static-equilibrium position.

This invention involves the use of a strong member or members having the proper mechanical stiffness and which is attached to or extends around the mid-section of the coil. The other end of the member is attached to the base. When the valve is forced opened by the cam, this member permits the approximate-middle valve spring coil to move freely toward the base of the valve spring. When the valve is closed, the member restrains the approximate-middle valve spring coil from extending a small distance (on the order of 2 mm) past the position corresponding with the static-equilibrium position.

During the time that the valve is being closed, the approximate-middle valve spring coil can be moving with a high velocity and have significant kinetic energy. The previously mentioned member that is used to restrain this coil must be sufficiently strong and stiff to arrest the motion of the coil. If the member is too stiff, excessive impact forces can be developed and the member could fail because of the high forces caused by the shock loading. If the member is too compliant, the member will permit the approximately middle valve spring coil to move too great of distance past the static-equilibrium position and result in ineffective spring damping and control.

One method of restraining the approximate-middle valve spring coil is by the use of a strong and flexible cable. A plurality of cables could be attached to the coil or extend around the appropriate section of the spring coil. The opposite end of the cables could be attached to the fixed member such as the base of the spring or to the engine head. The cables would flex and permit the approximate-middle coil to move toward the spring base when the valve is opening. The cables are sufficiently strong and have the proper stiffness to stop the extension motion of the approximate-middle valve spring coil when this coil reaches it static equilibrium point. A plurality of cables acting in series along the circumference of the approximate-middle valve spring coil could be used to provide the necessary strength and stiffness.

In another embodiment of the invention, the fixed ends of the cables are connected to second members that have more compliance than the cables. These second members would in turn be connected to the fixed base. In this embodiment, the compliant second members would reduce the shock or impact loading that results when the approximate-middle valve coil spring is arrested.

In a further embodiment of the invention, a braided or twisted wire or cable could be used to provide additional compliance, which would reduce the shock or impact loading that results from stopping a moving coil.

DETAILED DESCRIPTION OF THE ILLUSTRATED EMBODIMENT

Figure 1:
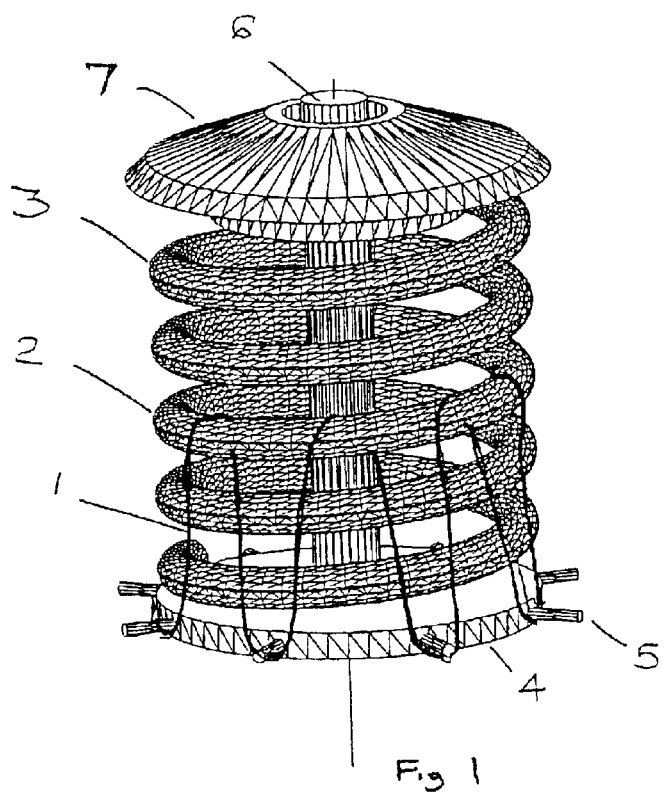
FIG. 1 is a perspective view of the embodiment showing the spring in a first compressed condition with the valve closed with taut cables 1 threaded around the approximate-middle spring coil 2 and attached to a base 4.

Turning now to the drawings in greater detail. Shown in FIG. 1 is an embodiment that uses a flexible cable 1 that is threaded around the approximate-middle coil 2 of the spring 3. As used herein, the phase "approximate middle of the coil" means the same as the phase "coil mid-section wherein each of these phases is intended to designate the portion of the coil (or coils) of the spring located approximately mid-way between the opposite end of the spring. In this figure, the valve 6 is shown in the closed position. A spring retainer 7 is attached to the valve 6 at the top part of the valve. In this embodiment, the spring 3 is resting on a base member 4. The base member 4 has a series of small pins 5 extending radially from the base member 4. The cable 1 (which is constructed for example of steel is substantially inelastic along its length) is threaded under the small pins 5. It is, of course understand by those skilled in the art that cables, e.g. steel, are not truly inelastic in that they are capable of being slightly elongated when axial forces are applied thereto and subsequently return to their original length when such axial forces are relieved. However, in the interest of the present invention, cables are describe herein as substantially inelastic because they do not stretch in length by an appreciable amount and thus limit the displacement of the coil-mid section in the means described herein. Since the valve is in the closed position, the cable 1 would be taut which prevents the approximate-middle coil 2 from extending away from the base 4. Since the valve is shown in the closed position, the approximate-middle coil is shown in the static-equilibrium position. In FIG. 1, the flexible cable 1 is not shown threaded around the entire circumference of approximate-middle coil 2. In practice, the cable 1 would be threaded around the entire circumference of the approximate-middle coil 2. Also in practice, the cable 1 would also be threaded around one complete loop of the coil mid-section so as to extend around the approximate-middle coil of a second spring (not shown) that fits inside the outer spring 3. Note that there are a multiple number of flexible cable connections between then approximate-middle coil 2 and the base member 4. These multiple connections provide the necessary strength to restrain the moving approximate-middle coil 2. Only one helical spring is shown in FIG. 1. In practice, concentric helical springs are often used. The cable 1 would be threaded around the approximate-middle coils of concentric helical springs.

Figure 5:
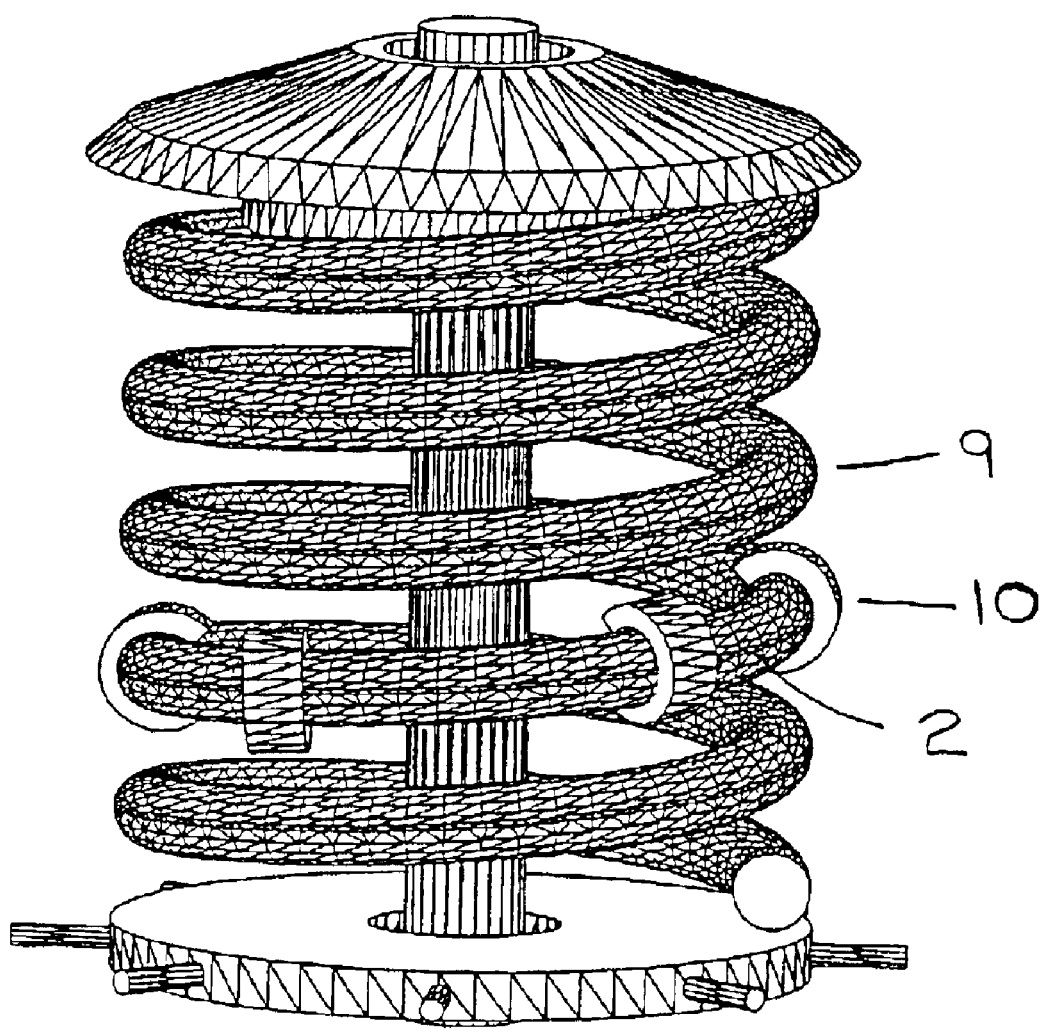
FIG. 5 is a perspective view of a spring 9, which positioned in it first, or valve-closed compressed condition, and a plurality of clips 10 secured along the mid-section of the spring. A clip 10 is shown attached to the approximate-middle coil 2 near to the point where the cable would pass over the coil.

With the embodiment shown in FIG. 1, the flexible cable 1 passing over the approximate-middle coil 2 can be damaged (crushed) if the coil 9 above this approximate-middle coil 2 comes into contact with each other. To prevent damage to the flexible cable 1, clips 10 (FIG. 5), having a thickness equal to or greater than the diameter of the cable, can be attached to the approximate-middle coil 2 near to the point that the flexible cable 1 passes over the coil. If a second inner spring is used inside the outer sprint, multiple clips 10 located on the approximate-middle coil will prevent the coils of the inner spring (not shown) for coming in contact with the cable. The examples of the clips 10 is illustrated in FIG. 5.

Figure 2:
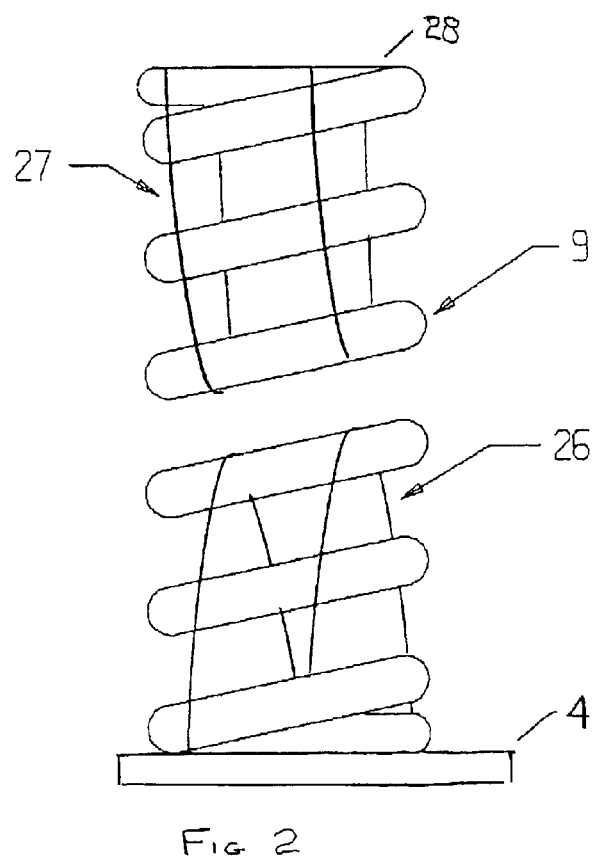
FIG. 2 shows a view of the spring 9 with a plurality of cables 26 connecting the approximate-middle value spring coil to the base 4 or fixed area of the spring. A plurality of cables 27 connecting the approximate middle valve spring coil to the top of the spring 28.

FIG. 2 illustrates a plurality of cables attached to the approximate mid-point of the spring 9. Cables 26 prevent the approximate-middle coil from moving away from the base 4. Cable 27 prevents the approximate-middle coil from moving away from the top 28 or retainer end of the spring.

Figure 3:
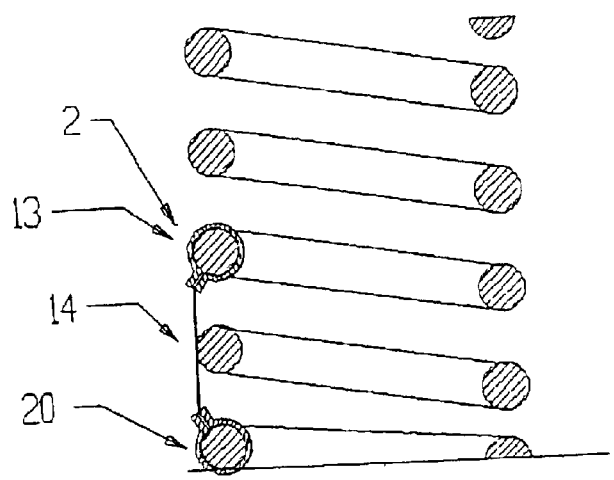
FIG. 3 is a cross-sectional view illustrating schematically the attachment of a cable to the spring of FIG. 1. One end of the flexible cable 14 is attached to the attachment member 13 and the opposite end of the flexible cable 14 is attached to the base coil 20.
Figure 4:
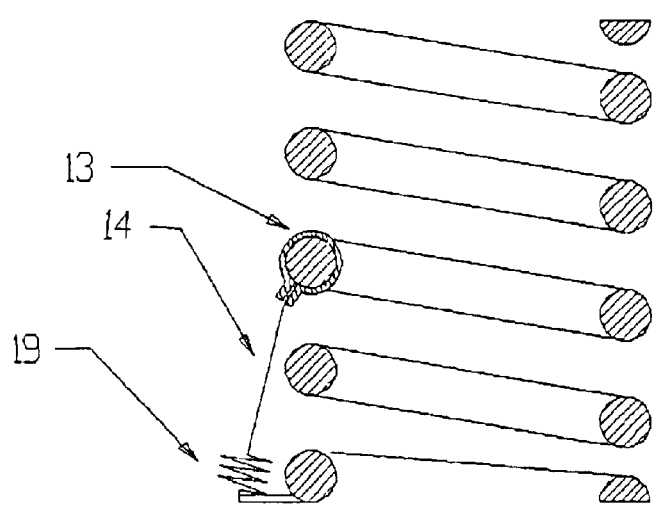
FIG. 4 is a view similar to that of FIG. 3 illustrating the attachment of a tension assembly within which a compliant member is embedded, such a spring 19. One end of the flexible cable 14 is attached to the attachment member 13 and the opposite end of the flexible cable is attached a flexible member 19 and the flexible member is attached to the base coil or to the base.

FIG. 3 show a means 13 for attaching the cable to the approximate-middle coil 2. This means has the advantage in that no protection clips 10 are required. FIG. 4 show an embodiment that uses an additional flexible member 19 in series with the cable 14 to provide additional compliance that will reduce the impact or shock loading to the cable. Typically, the compliant members would provide less than 2 mm of displacement.

Figure 6:
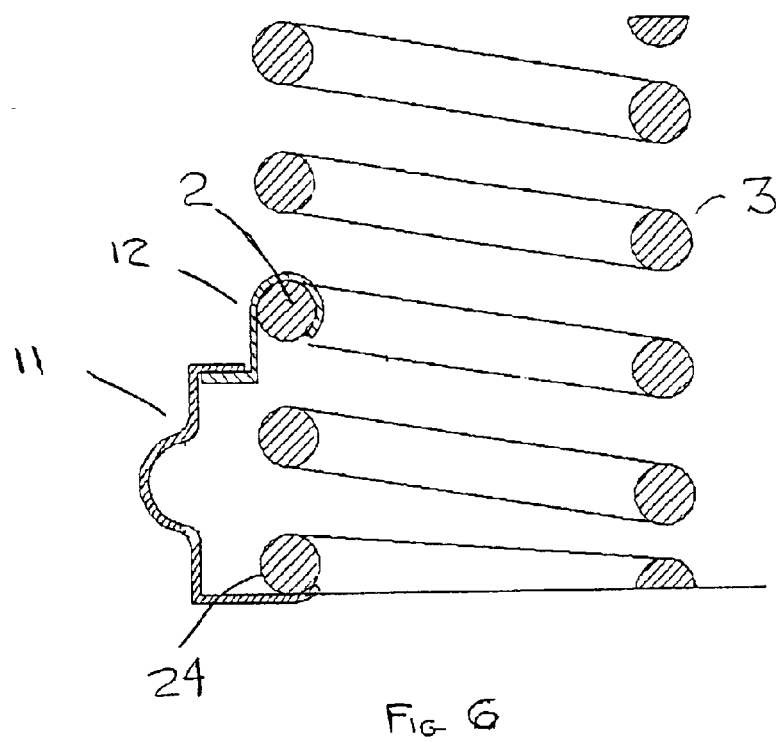
FIG. 6 is a cross-sectional view of the spring with the valve open. A cross section of a two-part damper assembly is shown. Part 11 is a non-rigid member attached to the base of the spring. Member 12 is attached to the approximate-middle coil 2.
Figure 7:
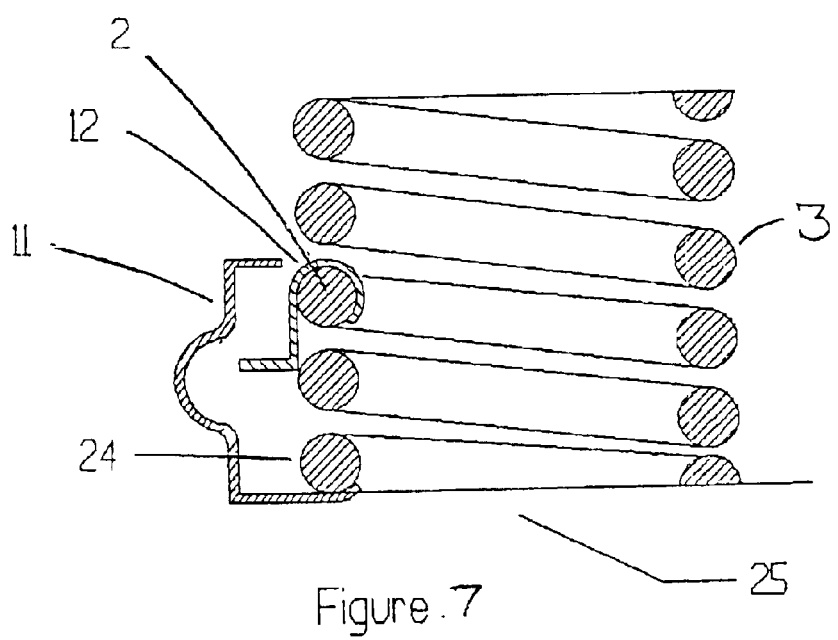
FIG. 7 is a cross-sectional view of the spring and the two-part assembly shown in FIG. 6 with the valve closed. Members 11 and 12 are in contact with one another and consequently limit the extension of the approximate middle coil 2 past the approximate-static equilibrium position.

FIGS. 6 and 7 show a means for using members to restrain the extension of the approximate-middle coil past the static-equilibrium position. Member 11 is designed to provide some axial deflection that will reduce the shock loading when member set 11 and 12 are used to arrest the moving approximate middle coil 2. Member 11 is attached to, or under the base coil 24. Member 12 is attached around the circumference of the approximate-middle coil 2. Member 11 overlaps members 12 and permits the approximate-middle coil to move toward the base 25. In FIG. 6 the spring 3 is shown in the position when the valve is open (spring compressed). The members 11 and 12 do not prevent the approximate-middle coil from moving toward the base 25. Because of the interference, or abutment, between members 11 and 12 as the spring is elongated from its compressed or valve-closed condition, the approximate-middle coil is restrained from moving up past the approximate static-equilibrium position as in shown in FIG. 7.

Figure 8:
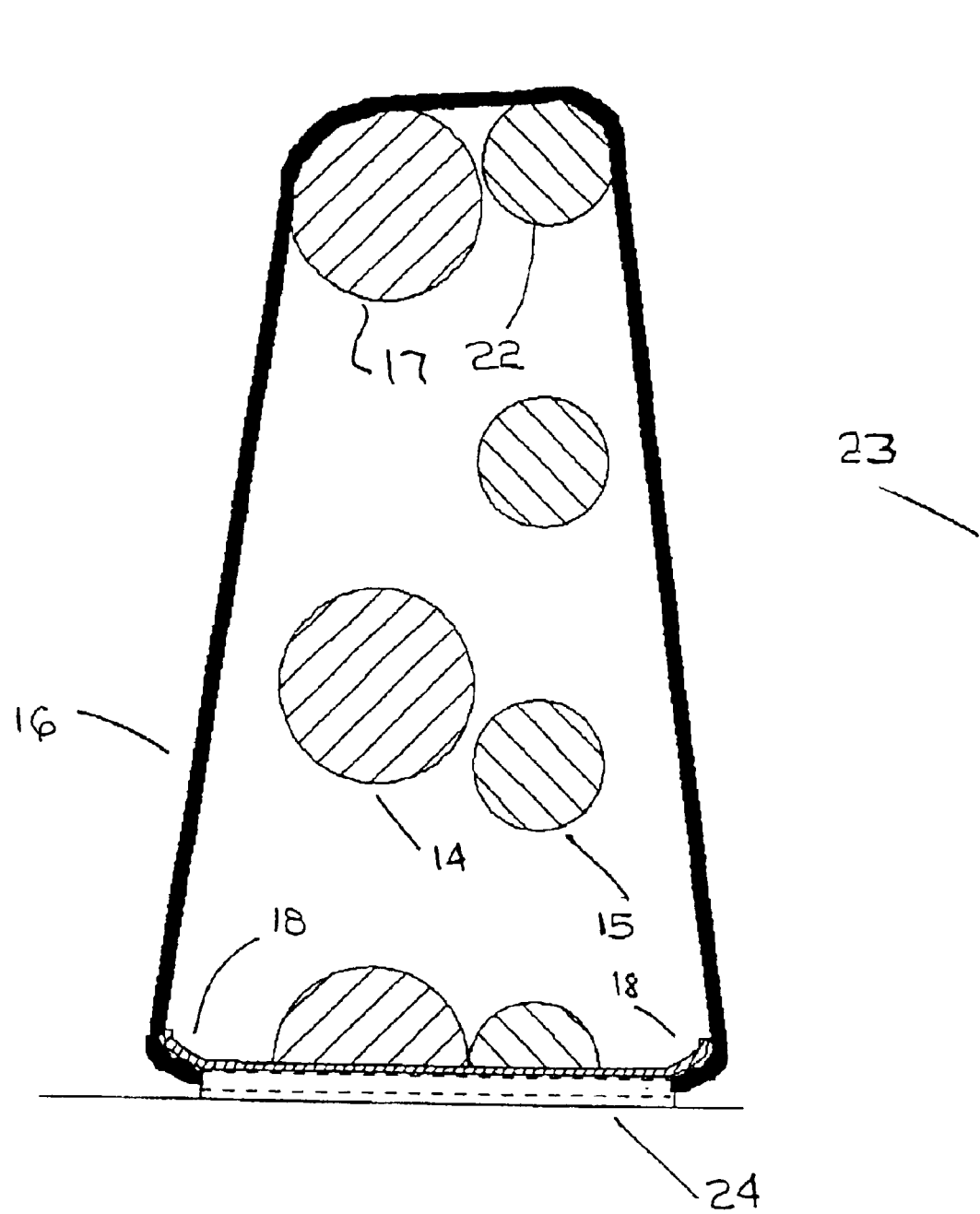
FIG. 8 is a cross-sectional view of only one side of the coils of the outer spring 14 and inner spring 15 with the valve open (spring extended). The centerline of the spring is indicated 23. A taunt cable 16 passes over the approximate-middle coils of both the inner spring 15 and outer spring 14 and over two-curved cantilever springs 18. The base of both springs rest on a cantilever spring 18.

FIG. 8 shows the lowers coils of one side of a dual concentric spring set. A flexible cable 16 extends as shown around both approximate-middle coils 17 and 22 of the inner and outer spring. In order to provide additional flexibility, cantilever beam springs 18 located on the outside and inside of the dual spring set are used. When the approximate-middle coils of both springs are moving up (away from the base 24), the flexible cable stops the upward motion of the approximately-middle coil when they reach the approximate static-equilibrium position. Impact forces in the cable are reduced by the combination of the stretching of the cable 16 and the bending deflection of the cantilever beam springs 18

In all of the figures, a plurality of elements is located approximately equally spaced around the circumference of the spring.

What is claimed is:

1. A device for reducing the resonant vibrations of a helical spring having two opposite ends which are movable toward and away from one another between a first condition corresponding with a condition at which the spring is in static equilibrium and a second condition at which the spring is more compressed than in its first condition and wherein the helical spring has a coil mid-section located approximately midway between the two ends of the spring, the device comprising:

means associated with the coil mid-section of the spring for limiting the movement of the coil mid-section away from one end of the spring to about the distance between the coil mid-section and said one end when the spring is disposed in its first condition, and said associated means includes means for acting between said one end of the coil and the coil mid-section for limiting the movement of the coil mid-section as aforesaid;

wherein the associated means includes tension means connected between said one end of the spring and the coil mid-section for preventing the coil mid-section from being displaced relative to said one end beyond a length equal to about the distance between the coil mid-section and said one end when the spring is disposed in its static equilibrium condition while not obstructing the movement of the spring ends toward and away from one another between the first and second conditions;

the tension means includes a substantially inelastic cable bound between said one end of the spring and the coil mid-section; and wherein the spring includes a member associated with said one end of the spring, and the member includes a central body and a series of pins projecting radially from the central body, and the substantially inelastic cable is threaded between the series of pins and the coil mid-section for limiting the movement of the coil mid-section away from one end of the spring as aforesaid.

2. A device for reducing the resonant vibrations of a helical spring having two opposite ends which are moveable toward and away from one another between a first condition corresponding with a condition at which the spring is in static equilibrium and a second condition at which the spring is more compressed than in its first condition and wherein the helical spring has a coil mid-section located approximately midway between the two ends of the spring, the device comprising:

means associated with the coil mid-section of the spring for limiting the movement of the coil mid-section away from one end of the spring to about the distance between the coil mid-section and said one end when the spring is disposed in its first condition, and said associated means includes means for acting between said one end of the coil and the coil mid-section for limiting the movement of the coil mid-section as aforesaid; and wherein the associated means includes tension means connected between said one end of the spring and the coil mid-section for preventing the coil mid-section from being displaced relative to said one end beyond a length equal to about the distance between the coil mid-section and said one end when the spring is disposed in its static equilibrium condition while not obstructing the movement of the spring ends toward and away from one another between the first and second conditions; and wherein the tension means includes a substantially inelastic tension member and a compliant member joined in series between said one end of the spring and the coil mid-section so that the coil mid-section can be moved freely toward and away from said one spring end as the two opposite ends of the spring are moved between the first and second conditions while any displacement of the coil mid-section away from said one end of the spring which exceeds the distance between the coil mid-section and said one end of the spring when the spring is disposed in its first condition is dampened by the compliant member.

3. The device as defined in claim 2 wherein the compliant member is adapted to permit no more than about 2 mm of displacement of the coil mid-section away from said one end of the spring which exceeds the distance between the coil mid-section and said one end of the spring when the spring is disposed in its first condition.

4. The device as defined in claim 2 wherein the compliant member is a flexible cable.

5. The device as defined in claim 1 wherein the tension means is a first tension means and the device further includes:

second tension means connected between the other end of the spring and the coil mid-section for preventing the coil mid-section from being displaced relative to said other end beyond a length equal to about the distance between the coil mid-section and said other end when the spring is disposed in its static equilibrium condition while not obstructing the movement of the spring ends toward and away from one another between the first and second conditions.

6. The device as described in claim 2 wherein the substantially inelastic tension member includes braided, woven, or twisted wires or cables.

7. A device for reducing the resonant vibrations of a helical valve spring of an internal combustion engine wherein the valve spring has opposite base and retainer ends which are movable toward and away from one another between a first compressed condition corresponding with a condition at which the spring is in static equilibrium and a second compressed condition and wherein the helical spring has a coil mid-section located approximately midway between the base and retainer ends of the spring, the device comprising:

means associated with the coil mid-section of the spring for limiting the movement of the coil mid-section away from one of the base and retainer ends of the spring to about the distance between the coil mid-section and said one of the base and retainer ends of the spring when the spring is disposed in its first compressed condition, said associated means includes means for acting between said one end of the coil and the coil mid-section for limiting the movement of the coil mid-section as aforesaid;

wherein the associated means includes tension means connected between said one spring end and the coil mid-section for preventing said one spring end and the coil mid-section for preventing the coil mid-section from being displaced relative to said spring end beyond a length equal to about the distance between the coil mid-section and said one spring end when the spring is disposed in its static equilibrium condition while not obstructing the movement of the spring ends toward and away from one another between the first and second compressed conditions;

wherein the tension means includes a substantially inelastic cable bound between said one spring end and the coil mid-section; and wherein the spring includes a member associated with said one spring end, and the member includes a central body and a series of pins projecting radially from the central body, and the substantially inelastic cable is threaded between the series of pins and the coil mid-section for limiting the movement of the coil mid-section away from said one spring end as aforesaid.

8. A device for reducing the resonant vibrations of a helical valve spring of an internal combustion engine wherein the valve spring has opposite base and retainer ends which are movable toward and away from one another between a first compressed condition corresponding with a condition at which the spring is in static equilibrium and a second compressed condition and wherein the helical spring has a coil mid-section located approximately midway between the base and retainer ends of the spring, the device comprising:

means associated with the coil mid-section of the spring for limiting the movement of the coil mid-section away from one of the base and retainer ends of the spring to about the distance between the coil mid-section and said one of the base and retainer ends of the spring when the spring is disposed in its first compressed condition, said associated means includes means for acting between said one end of the coil and the coil mid-section for limiting the movement of the coil mid-section as aforesaid;

wherein the associated means includes tension means connected between said one spring end and the coil mid-section for preventing said one string end and the coil mid-section for preventing the coil mid-section from being displaced relative to said spring end beyond a length equal to about the distance between the coil mid-section and said one spring end when the spring is disposed in its static equilibrium condition while not obstructing the movement of the spring ends toward and away from one another between the first and second compressed conditions; and wherein the tension means includes a substantially inelastic tension member and a compliant member connected in series between said one spring end, and the coil mid-section so that the coil mid-section can be moved freely toward and away from said one spring end as the two opposite ends of the spring are moved between the first and second compressed conditions while any displacement of the coil mid-section away from said one end of the spring which exceeds the distance between the coil mid-section and said one spring end when the spring is disposed in its first compressed condition is dampened by the compliant member.

9. The device as defined in claim 8 wherein the compliant member is adapted to permit no more than about 2 mm of displacement of the coil mid-section away from said one spring end which exceeds the distance between the coil mid-section and said one spring end when the spring is disposed in its first compressed condition.

10. The device as defined in claim 7 wherein the tension means is a first tension means and the device further includes:

second tension means connected between the other of the base and retainer ends of the spring and the coil mid-section for preventing the coil mid-section from being displaced relative to said other spring end beyond a length equal to about the distance between the coil mid-section and said other spring end when the spring is disposed in its static equilibrium condition while not obstructing the movement of the spring ends toward and away from one another between the first and second compressed conditions.

11. The device as described in claim 8 wherein the substantially inelastic tension member includes braided, woven, or twisted wires or cables.

\* \* \* \* \*